(12) United States Patent
Miller

(10) Patent No.: US 7,824,658 B2
(45) Date of Patent: Nov. 2, 2010

(54) METHOD OF MAKING ULTRASMALL CRYSTAL MTT MOLECULAR SIEVES

(75) Inventor: Stephen J. Miller, San Francisco, CA (US)

(73) Assignee: Chevron U.S.A., Inc., San Ramon, CA (US)

(*) Notice: Subject to any disclaimer, the term of this patent is extended or adjusted under 35 U.S.C. 154(b) by 590 days.

(21) Appl. No.: 11/945,001

(22) Filed: Nov. 26, 2007

(65) Prior Publication Data

US 2008/0159953 A1 Jul. 3, 2008

Related U.S. Application Data

(60) Provisional application No. 60/882,322, filed on Dec. 28, 2006.

(51) Int. Cl.
C01B 39/04 (2006.01)
(52) U.S. Cl. .................................. 423/706; 423/718
(58) Field of Classification Search ................ 423/704, 423/706, 718
See application file for complete search history.

(56) References Cited

U.S. PATENT DOCUMENTS

| | | | | |
|---|---|---|---|---|
| 4,076,642 A * | 2/1978 | Herber et al. | ............... | 252/78.5 |
| 4,076,842 A | 2/1978 | Plank et al. | | |
| 5,053,373 A * | 10/1991 | Zones | .................. | 502/64 |
| 5,252,527 A * | 10/1993 | Zones | .................. | 502/64 |
| 5,558,851 A * | 9/1996 | Miller | ................. | 423/702 |
| 5,785,947 A * | 7/1998 | Zones et al. | ............. | 423/705 |
| 7,390,763 B2 * | 6/2008 | Zones et al. | ............. | 502/64 |
| 2005/0092651 A1 * | 5/2005 | Zones et al. | ............. | 208/27 |

OTHER PUBLICATIONS

Zones et al, "Studies on the role of fluoride ion vs reation concentration in zeolite synthesis", J.Phys.Chem.B, 109, 652-661 (Dec. 2004).*
Ch Baerlocher et al., Atlas of Zeolite Framework Types, 5th Revised Edition, 2001, of the International Zeolite Association.

* cited by examiner

Primary Examiner—David M Brunsman
(74) Attorney, Agent, or Firm—Richard Sheridan

(57) ABSTRACT

A method for preparing a crystalline molecular sieve having MTT framework topology and crystallite sizes of about 150 to about 600 Angstroms, comprising:
a. preparing a reaction mixture comprising, in terms of mole ratios, the following.

| | |
|---|---|
| $YO_2/W_2O_3$ | 30-40 |
| $R^+/YO_2$ | 0.06-0.12 |
| $OH^-/YO_2$ | 0.20-0.26 |
| $K^+/YO_2$ | 0.09-0.15 | and an amount of water not substantially in excess of the amount required to cause and maintain crystallization, wherein Y is silicon, germanium or mixtures thereof; W is aluminum, boron, gallium, iron or mixtures thereof; and $R^+$ is a diisopropylimidazolium cation, and
b. heating said reaction mixture at crystallization conditions and in the absence of an external liquid phase for sufficient time to form a crystallized material containing crystals of the molecular sieve.

Also, a method to make the shaped ultrasmall crystal MTT molecular sieve, and a method to form the molecular sieve using a particular order of addition of components.

19 Claims, 3 Drawing Sheets

METHOD OF MAKING ULTRASMALL CRYSTAL MTT MOLECULAR SIEVES

This application claims benefit under 35 USC 119 of Provisional Application 60/882,322, filed Dec. 28, 2006.

FIELD OF THE INVENTION

The present invention relates to a process for producing crystalline molecular sieves having the MTT framework topology (i.e., the structure code MTT assigned by the International Zeolite Association) and having ultrasmall crystallites from a reaction mixture which contains only sufficient water to cause the MTT molecular sieve to crystallize.

BACKGROUND

Molecular sieves are a commercially important class of crystalline materials. They have distinct crystal structures with ordered pore structures which are demonstrated by distinct X-ray diffraction patterns. The crystal structure defines cavities and pores which are characteristic of the different species.

Molecular sieves having the MTT framework topology defined by the connectivity of the tetrahedral atoms (referred to herein simply as MTT or MTT molecular sieve) are known. See, for example, Ch. Baerlocher et al., Atlas of Zeolite Framework Types, 5$^{th}$ Revised Edition, 2001 of the International Zeolite Association. Examples of MTT molecular sieves include the zeolite designated "SSZ-32", SSZ-32 and methods for making it are disclosed in U.S. Pat. No. 5,053,373, issued Oct. 1, 1991 to Zones. This patent discloses the preparation of zeolite SSZ-32 using an N-lower alkyl-N'-isopropylimidazolium cation as an organic structure directing agent (SDA), sometimes called a templating agent. U.S. Pat. No. 4,076,842, issued Feb. 28, 1978 to Plank et al., discloses the preparation of the zeolite designated "ZSM-23", a zeolite with a structure similar to SSZ-32, using a cation derived from pyrrolidine as the SDA. Zeolites SSZ-32 and ZSM-23 are commonly referred to as having the MTT framework topology. Both of the aforementioned patents are incorporated herein by reference in their entirety. Other MTT zeolites include EU-13, ISI-4 and KZ-1.

U.S. Patent Application Publication No. 2005/0092651, published May 5, 2005 by Zones et al., discloses a small crystal SSZ-32 zeolite, designated SSZ-32X, having a mole ratio of silicon oxide to aluminum oxide greater than about 20:1 to less than 40:1 with crystallites having broad lathe-like components in the range of 200-400 Angstroms. U.S. Patent Application Publication No. 2005/0092651 is incorporated herein by reference in its entirety.

U.S. Pat. No. 5,558,851, issued Sep. 24, 1996 to Miller, discloses a method for preparing a crystalline aluminosilicate zeolite from a reaction mixture containing only sufficient water so that the reaction mixture may be shaped if desired. In the method, the reaction mixture is heated at crystallization conditions and in the absence of an external liquid phase, so that excess liquid need not be removed from the crystallized material prior to drying the crystals. U.S. Pat. No. 5,558,851 is incorporated by reference herein in its entirety.

SUMMARY OF THE INVENTION

Provided is a method for preparing a crystalline molecular sieve having MTT framework topology and having crystallite sizes in the range of about 150 to about 600 Angstroms, said method comprising:

a. preparing a reaction mixture comprising, in terms of mole ratios, the following:

| | |
|---|---|
| $YO_2/W_2O_3$ | 30-40 |
| $R^+/YO_2$ | 0.06-0.12 |
| $OH^-/YO_2$ | 0.20-0.26 |
| $K^+/YO_2$ | 0.09-0.15 | and an amount of water not substantially in excess of the amount required to cause and maintain crystallization, wherein Y is silicon, germanium or mixtures thereof, W is aluminum, boron, gallium, iron or mixtures thereof, and $R^+$ is a diisopropylimidazolium cation; and b. heating said reaction mixture at crystallization conditions and in the absence of an external liquid phase for sufficient time to form a crystallized material containing crystals of a molecular sieve having MTT framework topology and having crystallite sizes in the range of about 150 to about 600 Angstroms.

Also provided is a method for preparing a shaped crystalline molecular sieve having MTT framework topology and having crystallite sizes in the range of about 150 to about 600 Angstroms, said method comprising:

a. preparing a reaction mixture comprising, in terms of mole ratios, the following:

| | |
|---|---|
| $YO_2/W_2O_3$ | 30-40 |
| $R^+/YO_2$ | 0.06-0.12 |
| $OH^-/YO_2$ | 0.20-0.26 |
| $K^+/YO_2$ | 0.09-0.15 | and an amount of water not substantially in excess of the amount required to cause and maintain crystallization, wherein Y is silicon, germanium or mixtures thereof; W is aluminum, boron, gallium, iron or mixtures thereof; and $R^+$ is a diisopropylimidazolium cation ("DIPI") structure directing agent ("SDA");

b. forming said reaction mixture into shaped particles; and c. heating said reaction mixture at crystallization conditions and in the absence of an external liquid phase for sufficient time to form a crystallized material containing crystals of a molecular sieve having MTT framework topology and having crystallite sizes in the range of about 150 to about 600 Angstroms.

It is important, in preparing the reaction mixture used to prepare the small pore molecular sieve, that the amount of water present in the reaction mixture as prepared for the crystallization step be sufficient to cause and maintain crystallization of the molecular sieve, but not so much that the water forms a liquid to phase external to the reaction mixture, or transforms the reaction mixture into a solution or fluid gel. Conveniently, the reaction mixture will be in the form of granules, a powder or a self-supporting mass. While it is not a requirement to form the reaction mixture into shaped particles before the reaction mixture is subjected to crystallization conditions, it may be desired in many cases to do so. In this case, the amount of water used in the reaction mixture of this invention is less than the amount of water required in conventional processes for preparing molecular sieves. Thus, during the crystallization step according to the present process, there is no separate liquid phase present which must be removed from the crystallized material at the end of the crystallization step by, for example filtering or decanting, prior to drying the crystals. Also, the amount of water present in the reaction mixture is insufficient to cause the reaction mixture to collapse or "melt", i.e., once the reaction mixture is formed (including any adjustment in the liquid content that may be needed), the resulting mass is self-supporting. It is important to note that as used herein the term "self-supporting" (or any equivalent thereof) refers to a reaction mixture that does not collapse or "melt" Linder its own weight. This term includes the case where the reaction mixture is comprised of individual granules in which each granule is self-supporting or a powder in which each particle in the powder is self-supporting.

DETAILED DESCRIPTION OF EMBODIMENTS OF THE INVENTION

Figure 1:
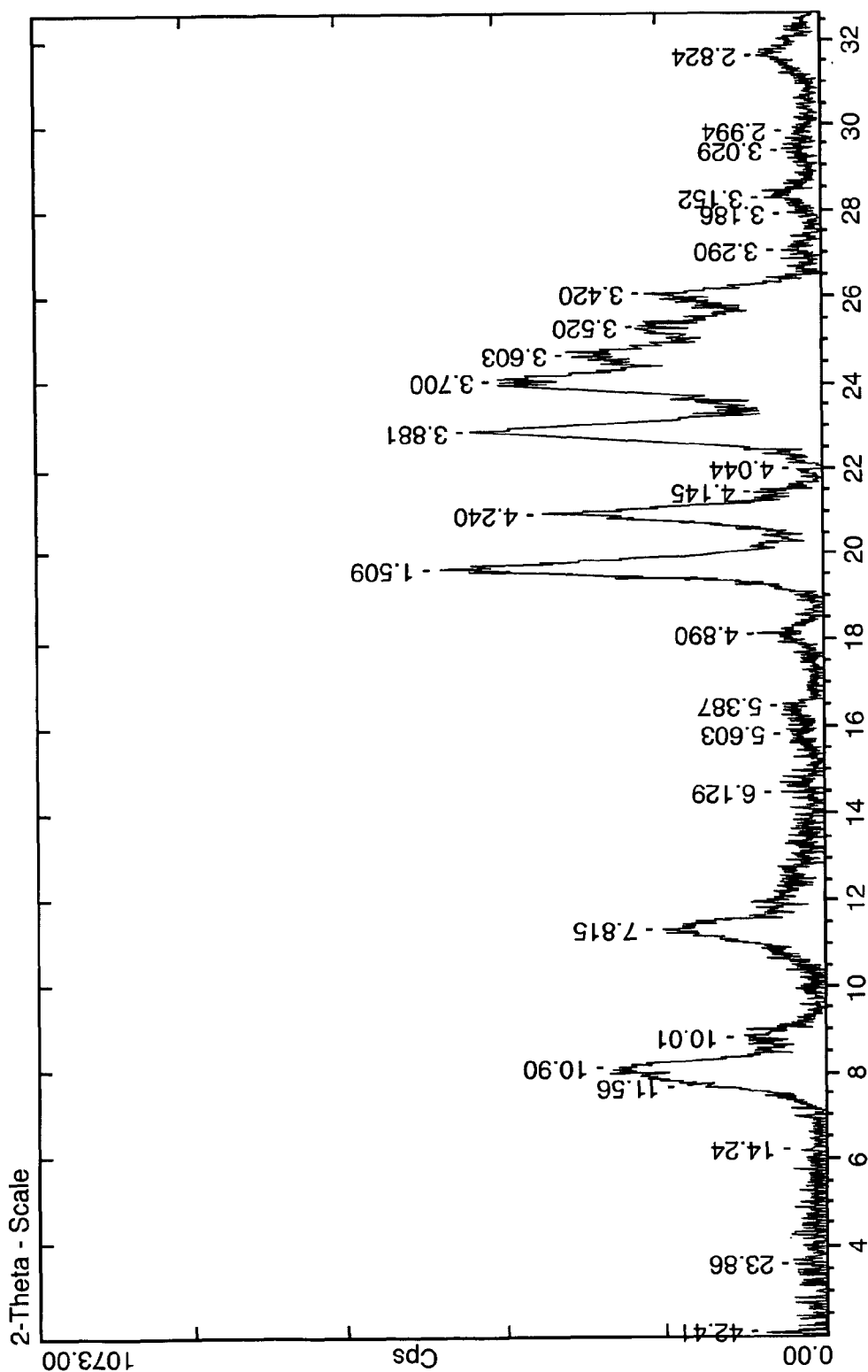
FIG. 1 is a powder X-ray diffraction pattern of an ultrasmall crystal MTT molecular sieve made in accordance with the present invention.

The present invention relates to a method of preparing molecular sieves having MTT framework topology and having crystallite sizes in the range of about 150 to about 600 Angstroms. For the sake of brevity, these MTT molecular sieves are referred to herein sometimes simply as "ultrasmall crystal MTT molecular sieves."

The reaction mixture from which and in which the ultrasmall crystal MTT molecular sieves are crystallized comprises, in terms of mole ratios, the following:

| | |
|---|---|
| $YO_2/W_2O_3$ | 30-40 |
| $R^+/YO_2$ | 0.06-0.12 |
| $OH^-/YO_2$ | 0.20-0.26 |
| $K^+/YO_2$ | 0.09-0.15 | and an amount of water not substantially in excess of the amount required to cause and maintain crystallization, wherein Y is silicon, germanium or mixtures thereof, W is aluminum, boron, gallium, iron or mixtures thereof: and $R^+$ is a diisopropylimidazolium cation.

As used herein, the term "not substantially in excess of the amount required to cause and maintain crystallization" means the minimum amount of water required which causes and maintains crystallization of the ultrasmall crystal MITT molecular sieves. This amount of water is considerably less than that required in conventional processes for preparing molecular sieves. While an amount slightly in excess of this minimum amount may be employed (especially if it is required to allow the reaction mixture to be thoroughly mixed and/or kneaded), the amount of water employed in the reaction mixture should not be so great that the reaction mixture turns into a solution or fluid gel. Conveniently, the amount of water employed is such that the $H_2O/YO_2$ mole ratio in the reaction mixture is about 1.9 to about 5.0 and in other embodiments is about 1.9 to about 4.5, or about 1.9 to about 2.5.

The amount of liquid required in the reaction mixture of the present invention, where the liquid may include aqueous and organic liquids (e.g., the SDA), is that amount which is needed to adequately blend the mixture. Thus, a reaction mixture is prepared by mixing water with active sources of the ultrasmall crystal MTT molecular sieves to form a uniform mass that can be, for example, in the form of a heavy paste-like consistency or in the form of a powder or granules. The active sources will be in a form which can be easily blended into a uniform mass, and may be, for example, powders, hydrated particles, or concentrated aqueous solutions. Sufficient water is added to wet all the starting material powders during mixing and/or kneading of the reaction mixture. Alternatively, sufficient water is added that the starting material powders may be a kneaded into a uniform and generally homogeneous, self-supporting mixture. It is not necessary that all of the active sources be readily soluble in water during kneading, since the water added to the active sources will be insufficient to make a fluid-like mixture. The amount of water added depends on the mixing apparatus and on the active sources employed. Those familiar with the art can readily determine without undue experimentation the amount of liquid required to properly mix active sources of the molecular sieve. For example, hydrated sources of the molecular sieve may require relatively less water, and dried sources may require relatively more. Though it is preferred that the mixture be blended and/or kneaded until the mixture has a uniform, homogeneous appearance, the length of time devoted to kneading the mixture is not critical in the present invention.

The water content of the reaction mixture after blending and/or kneading may be further adjusted, for example, by drying or by the addition of water so that the reaction mixture has the desired consistency.

The solids content of the reaction mixture will depend on the particular composition of the ultrasmall crystal MTT molecular sieve desired. Molecular sieves having a high mole ratio of $YO_2$ to $W_2O_3$ are within the scope of the process, including molecular sieves having a mole ratio of $YO_2$ to $W_2O_3$ of greater than 12, for example about 30 and higher.

Typical sources of silicon oxide ($SiO_2$) include silicates, silica hydrogel, silicic acid, colloidal silica, fumed silica, tetraalkyl orthosilicates silica hydroxides, precipitated silica and clays. Typical sources of aluminum oxide ($Al_2O_3$) when used in the reaction mixture include aluminates, alumina, and aluminum compounds such as $AlCl_3$, $Al_2(SO_4)_3$, aluminum hydroxide ($Al(OH)_3$), kaolin clays, and zeolites. In one embodiment, the source of aluminum oxide is Reheis F-2000 alumina (53-56 wt. % $Al_2O_3$). Germanium, boron, gallium and iron can be added in forms corresponding to their aluminum and silicon counterparts.

The reaction mixture also comprises one or more active sources of potassium oxide. Any potassium compound which is not detrimental to the crystallization of the ultrasmall crystal MTT molecular sieves is suitable, though potassium hydroxide is typically used.

It has been found that the particular order of addition of the components of the reaction mixture can assist in producing the ultrasmall crystal MTT molecular sieves. For example, if the active source of aluminum oxide (e.g., Reheis F-2000 alumina) is first converted to a sol by mixing with aqueous KOH, and then added to the source of silicon oxide followed by the addition of the DIPI SDA, synthesis of the ultrasmall crystal MTT molecular sieves can be enhanced.

In one embodiments of the present invention, depending on the consistency of the reaction mixture, it may be able to form the reaction mixture into a desired self-supporting shape before the crystallization step (referred to herein as the "preforming step"), thereby reducing the number of process steps required to prepare catalytic materials containing the molecular sieve prepared in the mixture. Prior to forming the reaction mixture, it may be necessary to change the liquid content of the reaction mixture, either by drying or by adding more liquid, in order to provide a formable mass which retains its shape. In general, for most shaping methods, water will generally comprise from about 20 percent to about 60 percent by weight, and in some embodiments from about 30 percent to about 50 percent by weight of the reaction mixture.

In the preforming step, the reaction mixture can be formed into shaped particles. Methods for preparing the particles are well known in the art, and include, for example, extrusion, spray drying, granulation, agglomeration and the like. The particles are preferably of a size and shape desired for the ultimate catalyst, and may be in the form of, for example, extrudates, spheres, granules, agglomerates and prills. The particles will generally have a cross sectional diameter between about 1/64 inch and about 1/2 inch, and preferably between about 1/32 inch and about 1/4 inch, i.e. the particles will be of a size to be retained on a 1/64 inch, and preferably on a 1/32 inch screen and will pass through a 1/2 inch, and preferably through a 1/4 inch screen.

In one embodiment, the shaped particles prepared from the reaction mixture will contain sufficient water to retain a desired shape. Additional water is not required in the mixture in order to initiate or maintain crystallization within the shaped particle. Indeed, it may be preferable to remove some of the excess water from the shaped particles prior to crystallization. Conventional methods for drying wet solids can be used to dry the shaped particles, and may include, for example drying in air or an inert gas such as nitrogen or helium at temperatures below about 200° C. and at pressures from subatmospheric to about 5 atmospheres pressure.

Naturally occurring clays, e.g., bentonite, kaolin, montmorillonite, sepiolite and attapulgite, are not required, but may be included in the shaped particles prior to crystallization to provide particles having good crush strength. Such clays can be used in the raw state as originally mined or can be initially subjected to calcination, acid treatment or chemical modification. Microcrystalline cellulose has also been found to improve the physical properties of the particles.

As stated above, the liquid present in the reaction mixture (which may be in the form of shaped particles) may be a combination of aqueous and organic liquids, so long as the amount of water present is sufficient to cause and maintain crystallization of the small pore molecular sieve, while at the same time optionally keeping the reaction mixture self-supporting. Since the total liquid content may affect, for example, the physical strength of any shaped particles made from the reaction mixture, it is preferred that the total volatiles content of the reaction mixture during crystallization be in the range of between about 20% and about 60% (w/w), and in some embodiments between about 30% and about 60% (w/w), where the total volatiles content is the measure of total volatile liquid, including water, in the reaction mixture. It is a feature of the present process that no additional liquid beyond that required to cause and maintain crystallization of the ultrasmall crystal MTT molecular sieves is required for crystallization of the ultrasmall crystal MTT molecular sieves within the reaction mixture.

Crystallization of the molecular sieve takes place in the absence of an external liquid phase, i.e., in the absence of a liquid phase separate from the reaction mixture. In general, it is not detrimental if some liquid water is present in contact with the reaction mixture or with the shaped particles during crystallization, and it can be expected that some water may appear on the surface of the reaction mixture, such as in the form of beads, during crystallization. However, it is an objective to provide a method of crystallizing ultrasmall crystal MTT molecular sieves in such a way as to minimize the amount of water which must be treated and/or discarded following crystallization. To that end, the present method provides a method of synthesizing ultrasmall crystal MTT molecular sieves which requires no additional water for crystallization beyond a sufficient amount of water required to cause and maintain crystallization of the molecular sieve, while at the same time optionally keeping the reaction mixture self-supporting. Indeed, under certain conditions, liquid water present during crystallization may alter the form of the reaction mixture or shaped particles, and, in extreme circumstances, may cause the reaction mixture or shaped particles to lose their integrity or to dissolve.

Crystallization is conducted at an elevated temperature and usually in an autoclave so that the reaction mixture is subject to autogenous pressure until the small pore molecular sieve crystals are formed. The temperatures during the hydrothermal crystallization step are typically maintained from about 165° C. to about 175° C.

It is an important feature that the crystallization of the small pore molecular sieve is frequently accelerated relative to conventional crystallization methods. Thus, the crystallization time required to form crystals will typically range from about 24 to about 72 hours.

The ultrasmall crystal MTT molecular sieve is crystallized within the reaction mixture, which comprises amorphous, non-crystalline reagents. Crystals of a molecular sieve capable of forming the ultrasmall crystal MTT molecular sieves (i.e., "seed" crystals) can be added to the mixture prior to the crystallization step, and methods for enhancing the crystallization of molecular sieves by adding "seed" crystals are well known. Conveniently, when used, the seed crystals are crystals of the MTT molecular sieve. The seed crystals can be employed in amounts from about 1 to about 10 wt. % of the weight of silicon oxide (calculated from the amount of active silica source) in the reaction mixture.

In one embodiment, once the molecular sieve crystals have formed, the crystals are water-washed and then dried, e.g. at 90° C. to 150° C. for from 8 to 24 hours. The drying step can be performed at atmospheric or subatmospheric pressures.

In one embodiment, the ultrasmall crystal MTT molecular sieves are used in catalysts in a process whereby a feed including straight chain and slightly branched paraffins are dewaxed to produce an isomerized product.

EXAMPLES

Example 1

An ultrasmall crystal MTT molecular sieve was prepared as follows:

To 150 grams of silica (Hi-Sil 233) in a Baker-Perkins mixer were added 12 grams of Al(OH)3 (Reheis F2000, 53 wt % Al2O3, 47 wt % H2O) and the resulting mixture was mixed for 20 minutes. To this were added 194 grams of a 1 molar solution of diisopropylimidazolium hydroxide with mixing for 15 minutes. Next were added 36 grams of a 50% aqueous solution of KOH and mixed for 20 minutes. The mixer walls were heated to 60° C. to dry the mixture to a volatiles content of 55 Wt %. Molar ratios in the mixture were as follows:

$R+/SiO_2=0.085$ $OH-/SiO_2=0.23$ $M^+/SiO_2=0.14$ $SiO_2/Al_2O_3=36$ $H_2O/SiO_2=4.1$

Figure 2:
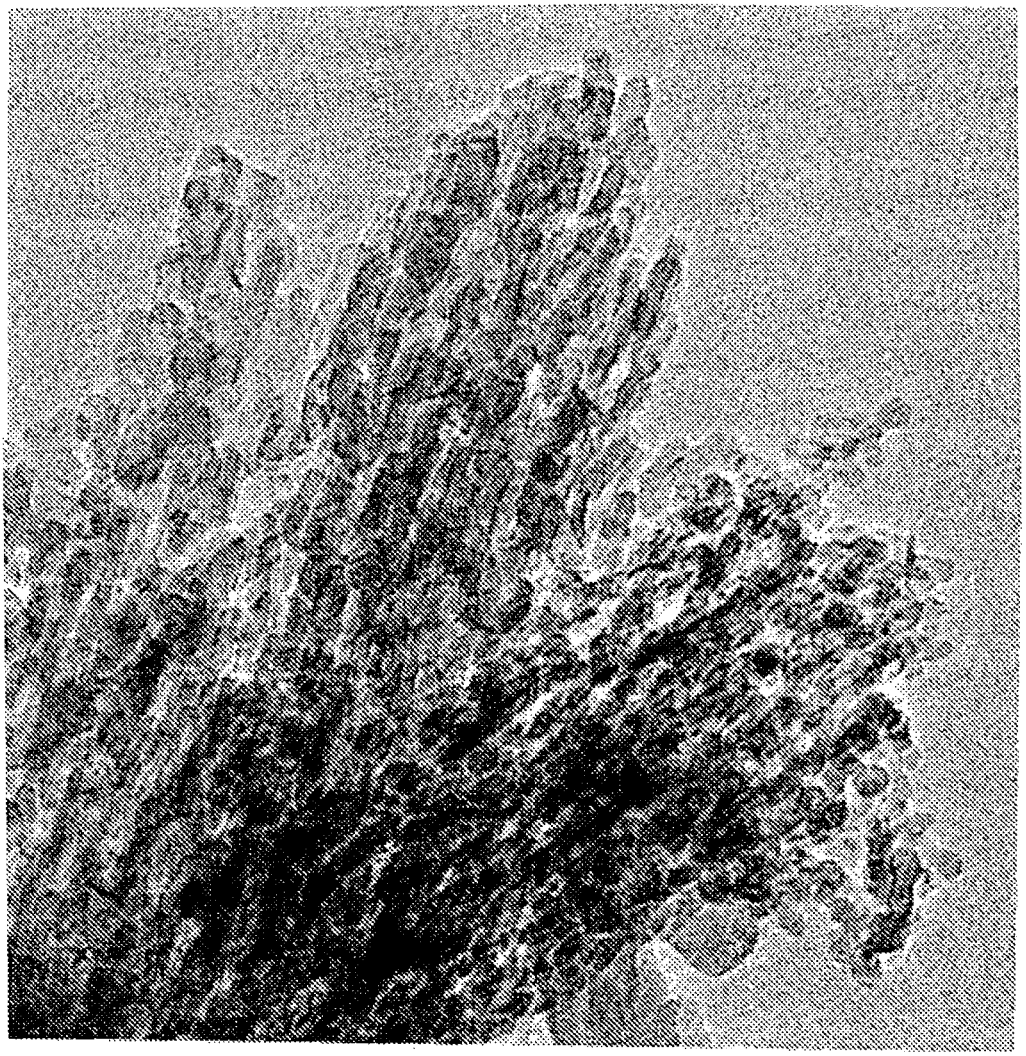
FIG. 2 is a TEM photomicrograph of the ultrasmall crystal MTT molecular sieve having crystallite sizes in the range of about 150 to about 600 Angstroms made by a process wherein the amount of water used in the reaction mixture was not substantially in excess of the amount required to cause and maintain crystallization.

The mixture was placed in a Teflon bottle in a stainless steel pressure vessel and heated to 170° C. for three days. The product was washed with pH 12.5 KOH solution at 80° C. three times, then once with water. It was then dried overnight in a vacuum oven at 120° C., and calcined for nine hours at 580° C. The product was identified as ZSM 23-type by x-ray diffraction analysis. The x-ray diffraction analysis (FIG. 1) also confirmed the small crystal size as shown in the (transmission electron micrograph of FIG. 2.

Comparative Example 1

To 150 grams of silica (Hi-Sil 233) in a Baker-Perkins mixer were added 10 (39 grams of Al(OH)$_3$ (Reheis F2000, 53 wt % Al$_2$O$_3$, 47 wt % H$_2$O) and the resulting mixture was mixed for five minutes. To this were added 170 grams of a 1.15 molar solution of diisopropylimidazolium hydroxide followed by 22 grams of a 50 wt % aqueous solution of KOH and the resulting mixture was mixed for 3.5 hours. To this were added 15 grams of water to bring the mix to a paste. Then 3.5 grams of kaolin clay powder were added, and slow mixing continued with the mixer walls heated to about 60° C. to convert the mix to an extrudable mass. The mix was then extruded through a 1/12-inch die in a Carver press and placed on a screen to dry at room temperature to a volatiles content of 45 wt %. Molar ratios in the extrudate were as follows, $R+/SiO_2=0.086$ $OH-/SiO_2=0.17$ $M^+/SiO_2=0.12$ $SiO_2/Al_2O_3=36$ The extrudate was placed in a Teflon bottle in a stainless steel pressure vessel and heated at 170° C. and autogenous pressure for four days. The extrudate was washed with water, dried overnight at 120° C. in a vacuum oven, and calcined in air at 593° C. for about eight hours. The product was identified as ZSM-23-type by x-ray diffraction analysis. The 2-theta d-spacings from the x-ray diffraction analysis are summarized in TABLE I.

TABLE I

| 2Θ | d spacing | Relative Intensity |
|---|---|---|
| 7.150 | 12.3535 | 38.95 |
| 7.200 | 12.2678 | 40.60 |
| 7.250 | 12.1833 | 47.11 |
| 7.290 | 12.1165 | 47.78 |
| 7.614 | 11.6015 | 72.12 |
| 8.691 | 10.1657 | 11.69 |
| 13.477 | 6.5648 | 7.79 |
| 14.598 | 6.0633 | 7.23 |
| 20.560 | 4.3164 | 20.81 |
| 20.919 | 4.2431 | 31.43 |
| 21.661 | 4.0995 | 67.56 |
| 22.514 | 3.9460 | 100.00 |
| 23.010 | 3.8621 | 27.95 |
| 25.465 | 3.4950 | 7.71 |
| 27.234 | 3.2718 | 10.62 |
| 28.850 | 3.0922 | 8.41 |
| 29.749 | 3.0008 | 9.87 |
| 33.491 | 2.6735 | 5.96 |
| 35.947 | 2.4963 | 16.17 |

Figure 3:
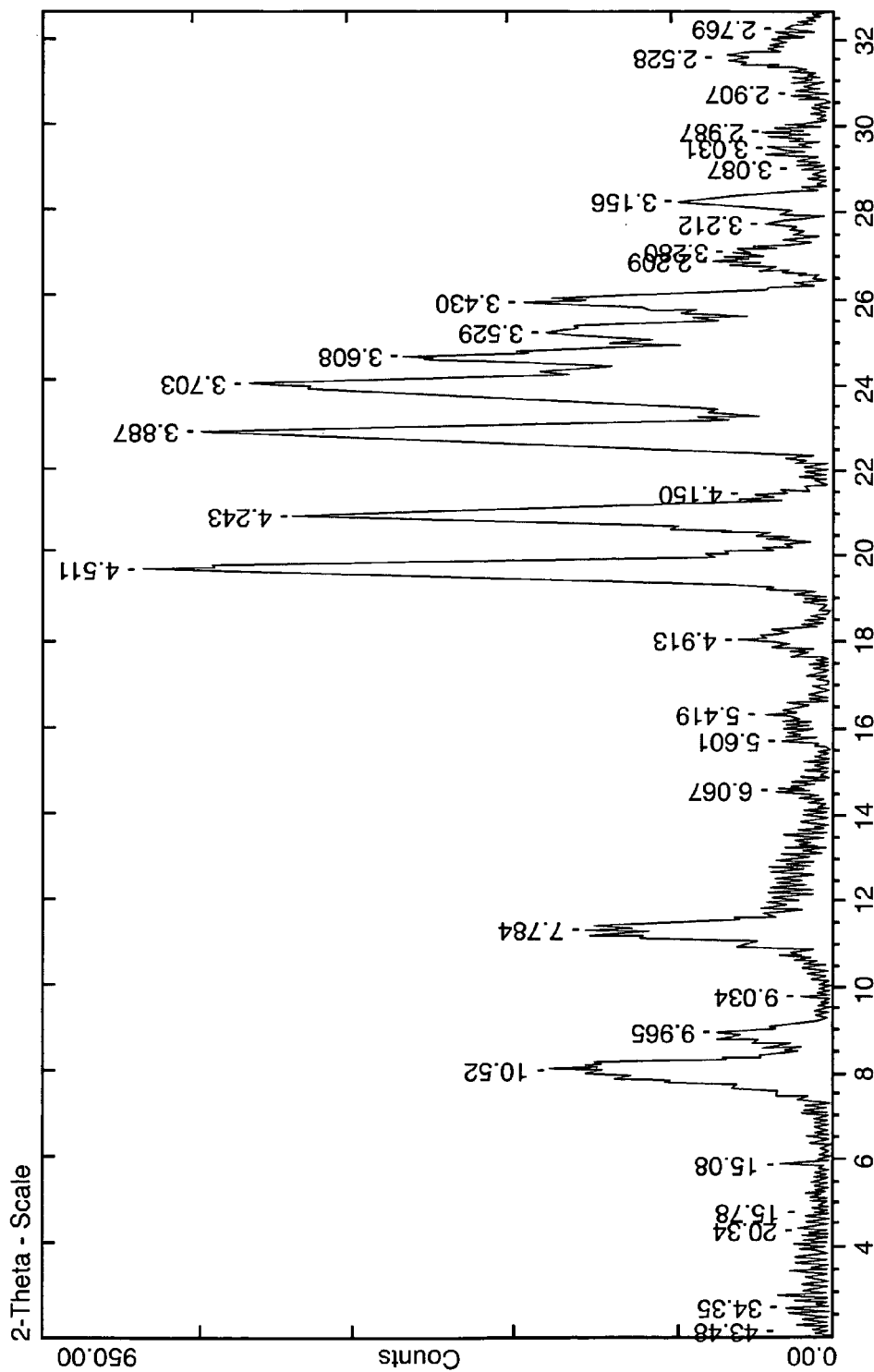
FIG. 3 is a powder X-ray diffraction pattern of zeolite ZSM-23 made in accordance with the prior art technique of Example 19 of U.S. Pat. No. 5,558,851.

The X-ray diffraction pattern of Comparative Example 1 is shown in FIG. 3. Comparative Example 1 is the same as Example 19 from U.S. Pat. No. 5,558,851.

What is claimed is:

1. A method for preparing a crystalline molecular sieve having MTT framework topology and having crystallite sizes in the range of about 150 to about 600 Angstroms, said method comprising:
   a. preparing a reaction mixture comprising, in terms of mole ratios, the following:

| 1) $YO_2/W_2O_3$ | 30-40 |
|---|---|
| 2) $R^+/YO_2$ | 0.06-0.12 |
| 3) $OH^-/YO_2$ | 0.20-0.26 |
| 4) $K^+/YO_2$ | 0.09-0.15 |

5) and an amount of water not substantially in excess of the amount required to cause and maintain crystallization, wherein Y is silicon, germanium or mixtures thereof; W is aluminum, boron, gallium, iron or mixtures thereof; and R$^+$ is a diisopropylimidazolium cation; and
   b. heating said reaction mixture at crystallization conditions and in the absence of an external liquid phase for sufficient time to form a crystallized material containing crystals of a molecular sieve having MTT framework topology and having crystallite sizes in the range of about 150 to about 600 Angstroms.

2. The method of claim 1, wherein said reaction mixture during crystallization has a water to YO$_2$ mole ratio between about 1.9 and about 5.0.

3. The method of claim 2 wherein said reaction mixture during crystallization has a water to YO$_2$ mole ratio between about 1.9 and about 2.5.

4. The method of claim 1 wherein the mole ratio of YO$_2$ to W$_2$O$_3$ in the MTT molecular sieve is greater than 12.

5. The method of claim 3 wherein the YO$_2$ to W$_2$O$_3$ molar ratio is 30 or higher.

6. The method of claim 1 wherein in step a, the W$_2$O$_3$ is first converted to a sol by mixing with aqueous KOH, and then the sol is added to YO$_2$ to produce a W$_2$O$_3$/KOH/YO$_2$ mixture, followed by the addition of R$^+$ to said mixture.

7. A method for preparing a shaped crystalline molecular sieve having MTT framework topology and having crystallite sizes in the range of about 150 to about 600 Angstroms, said method comprising:
   a. preparing a reaction mixture comprising, in terms of mole ratios, the following:

| 1) $YO_2/W_2O_3$ | 30-40 |
|---|---|
| 2) $R^+/YO_2$ | 0.06-0.12 |
| 3) $OH^-/YO_2$ | 0.20-0.26 |
| 4) $K^+/YO_2$ | 0.09-0.15 |

5) and an amount of water not substantially in excess of the amount required to cause and maintain crystallization, wherein Y is silicon, germanium or mixtures thereof; W is aluminum, boron gallium, iron or mixtures thereof; and R$^+$ is a diisopropylimidazolium cation;
   b. forming said reaction mixture into shaped particles; and
   c. heating said reaction mixture at crystallization conditions and in the absence of an external liquid phase for sufficient time to form a crystallized material containing crystals of a molecular sieve having MTT framework topology and having crystallite sizes in the range of about 150 to about 600 Angstroms.

8. The method of claim 7, wherein said shaped particles during crystallization have a water to YO2 mole ratio between about 1.9 and about 5.0.

9. The method of claim 8 wherein said shaped particles during crystallization have a water to $YO_2$ mole ratio between about 1.9 and about 2.5.

10. The method of claim 7 wherein the mole ratio of $YO_2$ to $W_2O_3$ in the MTT molecular sieve is greater than 12.

11. The method of claim 10 wherein the $YO_2$ to $W_2O_3$ molar ratio is 30 or higher.

12. The method of claim 7 wherein in step a, the $W_2O_3$ is first converted to a sol by mixing with aqueous KOH, and then the sol is added to $YO_2$ to produce a $W_2O_3/KOH/YO_2$ mixture, followed by the addition of $R^+$ to said mixture.

13. A method for preparing a crystalline molecular sieve having MTT framework topology and having crystallite sizes in the range of about 150 to about 600 angstroms, said method comprising:
   a. converting $W_2O$ to a sol by mixing with aqueous KOH;
   b. adding the sol to $YO_2$ to produce a $W_2O_3/KOH/YO_2$ mixture;
   c. adding $R^+$ to said $W_2O_3/KOH/YO_2$ mixture to form a reaction mixture having a mole ratio of water to $YO_2$ between about 1.9 and about 5.0, from which the crystalline molecular sieve is formed; wherein Y is silicon, germanium, or mixture thereof; W is aluminum, boron, gallium, iron, or mixtures thereof; and $R^+$ is a diisopropylimidazolium cation.

14. The method of claim 13, wherein the reaction mixture has a mole ratio of water to $YO_2$ between about 1.9 and about 4.5.

15. The method of claim 14, wherein the reaction mixture has a mole ratio of water to $YO_2$ between about 1.9 and about 2.5.

16. The method of claim 13, wherein the reaction mixture comprises, in terms of mole ratios, the following:

| | |
|---|---|
| 1) $YO_2/W_2O_3$ | 30-40 |
| 2) $R^+/YO_2$ | 0.06-0.12 |
| 3) $OH^-/YO_2$ | 0.20-0.26 |
| 4) $K^+/YO_2$ | 0.09-0.15. |

17. The method of claim 13, including the additional step of crystallizing the molecular sieve in the absence of an external liquid phase.

18. The method of claim 13, wherein the crystallizing is conducted at a temperature from about 165° C. to about 175° C.

19. The method of claim 13, where a time to form crystals is from about 24 to about 72 hours.

* * * * *